UNITED STATES PATENT OFFICE.

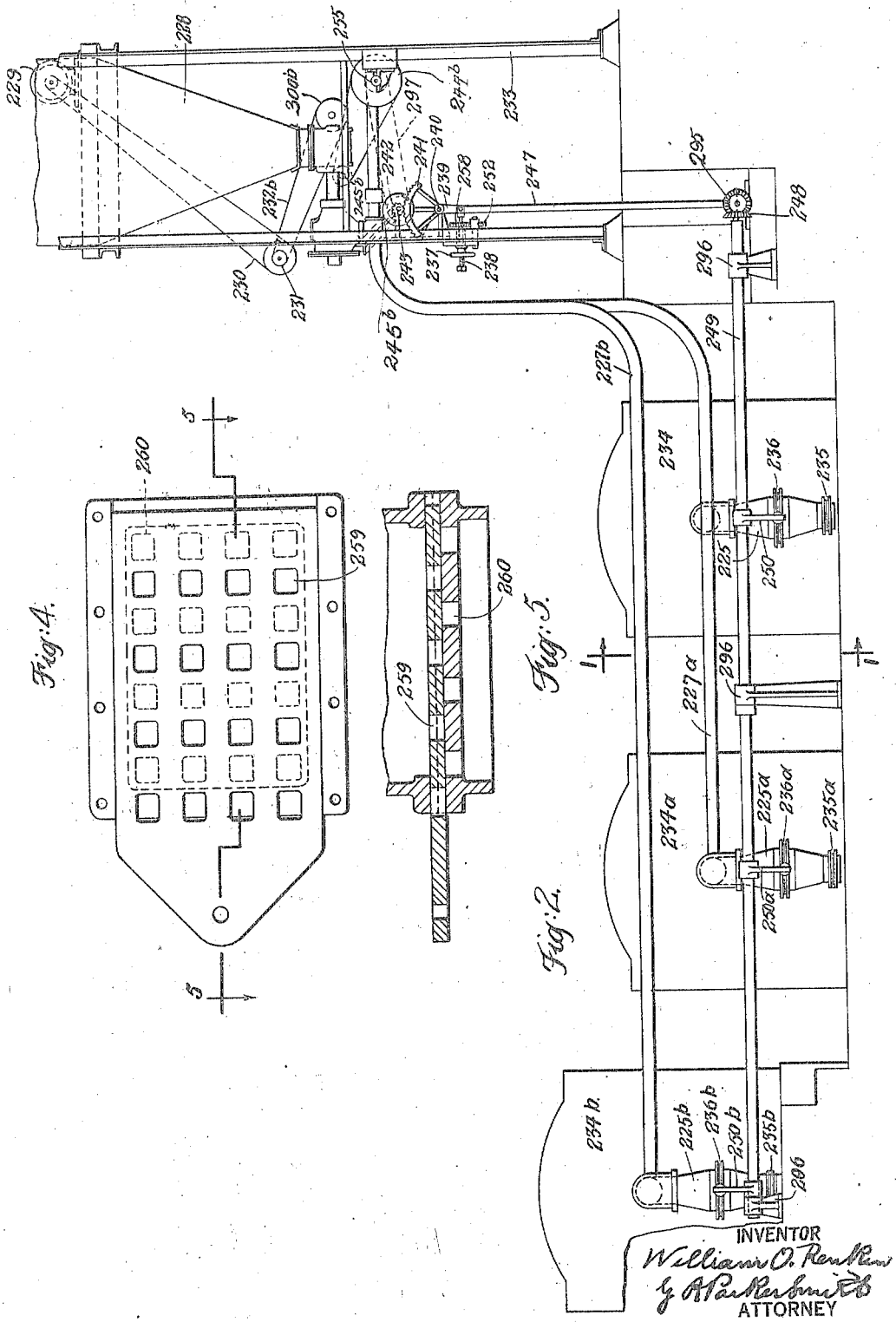

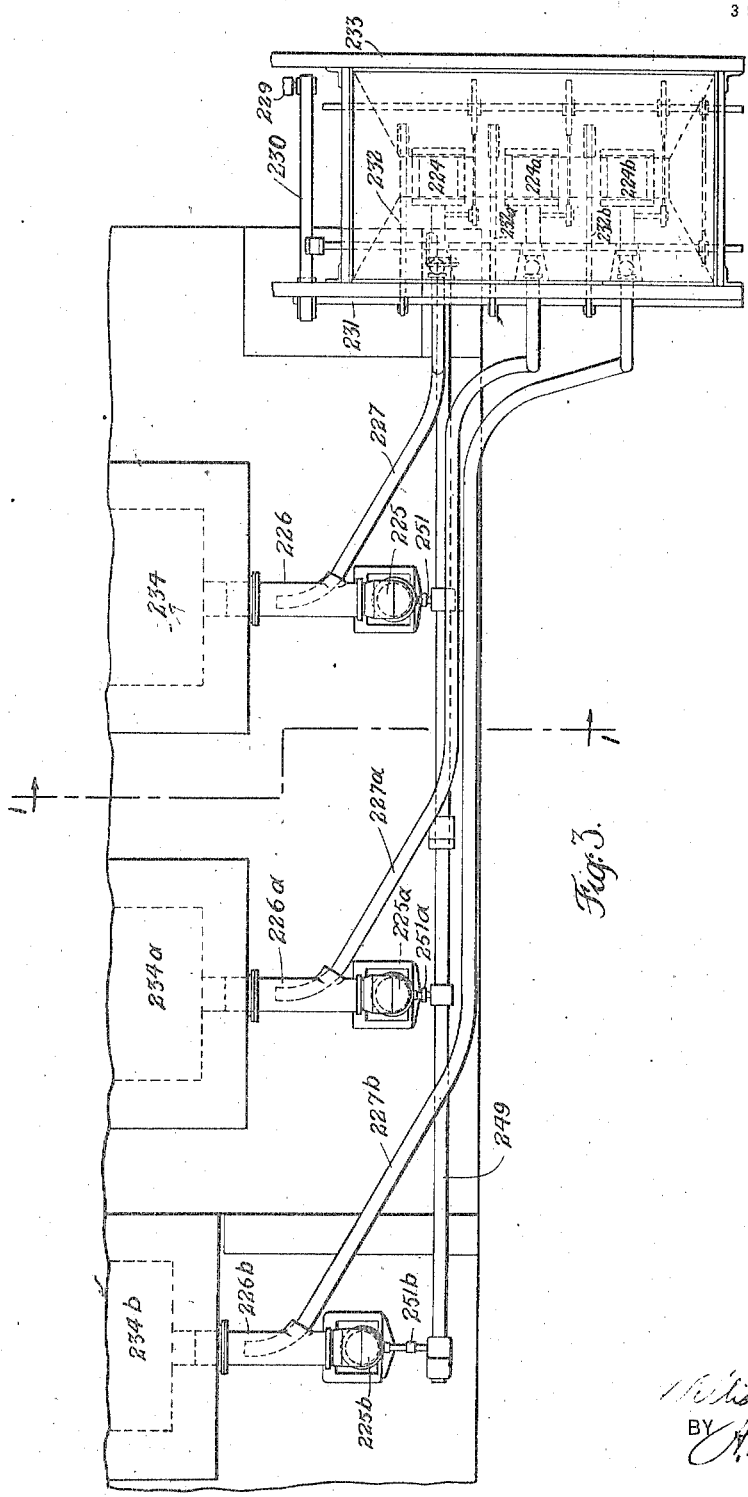

WILLIAM O. RENKIN, OF ORADELL, NEW JERSEY, ASSIGNOR TO QUIGLEY FURNACE SPECIALTIES CO., INC., A CORPORATION OF NEW YORK.

COMBINED AIR AND PULVERIZED-FUEL CONTROL.

1,308,368.

Specification of Letters Patent.

Patented July 1, 1919.

Application filed January 31, 1918. Serial No. 214,751.

*To all whom it may concern:*

Be it known that I, WILLIAM O. RENKIN, a citizen of the United States of America, residing at Oradell, county of Bergen, State of New Jersey, have invented certain new and useful Improvements in Combined Air and Pulverized-Fuel Control, of which the following is a specification.

My invention relates to systems for feeding pulverized fuel to furnaces. In these systems the finely pulverized coal is driven into the combustion chamber by a jet or current of compressed air and at the furnace inlet a larger volume of low pressure air, called secondary air, is also mixed with the fuel to support combustion. The secondary air has heretofore been regulated independently of the primary or fuel driving air. This requires the exercise of much skill and good judgment by the operator. When unskilled labor is employed it is well, however, to have the proper proportion of fuel and air insured at all times by connecting together the two means for regulation so that they may be simultaneously operated from one hand wheel or similar device and so automatically preserve a predetermined ratio between air and fuel supplies. The controlling means for a bank of furnaces may be thus all operated from one point.

The best form of apparatus embodying my invention at present known to me is illustrated in the accompanying three sheets of drawing in which Figure 1 is a side elevation (with certain parts shown in section) of a series of furnaces each equipped with a separate pulverized fuel burning apparatus, in which the air and fuel supply may be jointly and simultaneously operated from one controlling hand wheel, or in which the fuel and air may be separately regulated, as may be preferred.

Fig. 2 is a front elevation of said furnaces and apparatus.

Fig. 3 is a plan view thereof.

Fig. 4 is a detail plan view and

Fig. 5 is a cross section on line 5—5 of Fig. 4, showing the preferred form of slide valve or gate for controlling the air supply in an arrangement for jointly regulating the fuel and air such as is illustrated in Figs. 1, 2 and 3.

Figure 1:
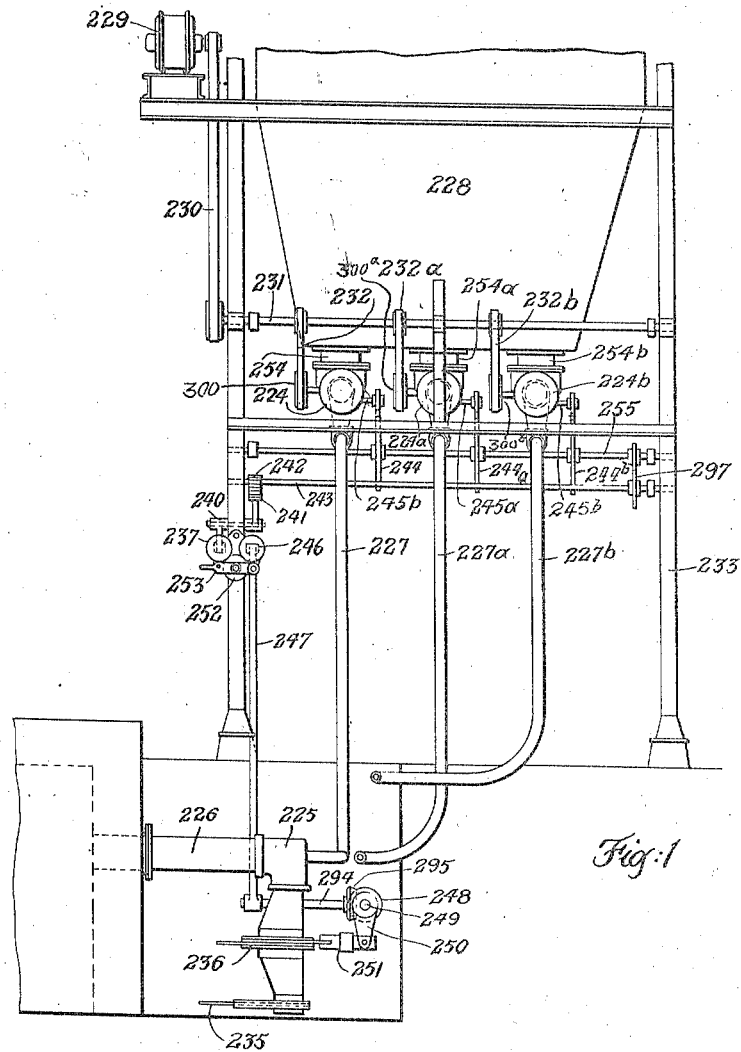

Throughout the drawings like reference characters indicate like parts. 234, 234$^a$ and 234$^b$, represent three furnaces supplied with pulverized fuel from three controllers 224, 224$^a$ and 224$^b$, and with secondary air for combustion from blast pipes 225, 225$^a$ and 225$^b$. Each furnace has a burner 226, 226$^a$, or 226$^b$ of construction usual in plants of this kind to which the pulverized fuel is brought on a current of air under more or less pressure, from its fuel controller through pipe 227, 227$^a$ or 227$^b$. A supply of pulverized coal is stored in bin 228, from which it flows down through gates 254, 254$^a$, and 254$^b$ to the several controllers 224, 224$^a$ and 224$^b$ which may be of the construction described in my application Serial No. 204,788, filed Nov. 30, 1917. These controllers are operated from an electric motor 229, through belt 230, countershaft 231 and belts 232, 232$^a$, and 232$^b$ running over pulleys 300, 300$^a$, and 300$^b$ on the respective controllers. This apparatus is supported on framework 233. The secondary air for each furnace is controlled by a regulating valve 236, 236$^a$ or 236$^b$, and a hand operated shut-off gate 235, 235$^a$, or 235$^b$. When the fuel and air supplies are to be contemporaneously graduated by the mechanism next to be described the proportion of secondary air to fuel in the several furnaces is fixed by adjustment of the several shut-off gates, 235, 235$^a$ and 235$^b$, and such proportion thereafter remains constant.

The fuel controllers 224, 224$^a$ and 224$^b$, are all regulated in unison from hand wheel 237, which is mounted on and revolves with an internally threaded sleeve which moves longitudinally a screw threaded rod similar to the one marked 238 in Fig. 2, but which does not show in said figure of drawing because it is behind 238. This screw threaded rod has a pin and eye connection to the end of crank 239, on bell crank shaft 240. This shaft 240 carries a toothed sector 241, which meshes with pinion 242 on shaft 243. At the other end of shaft 243 (see Fig. 1) is a sprocket wheel and chain connection 297, to countershaft 255 which carries three sprocket wheel and chain operating connections 244, 244$^a$ and 244$^b$, to the shutter regulating screws 245, 245$^a$ and 245$^b$ of the respective fuel controllers. Rotation of hand wheel 237, will open or close all of these controller shutters and so simultaneously regulate the fuel delivered by each of them.

The secondary air regulating valves 236, 236$^a$ and 236$^b$ are all controlled from a second, similar hand wheel 246, which operates another adjusting screw 238, connected to the upper end of vertical lever 247, the lower end of which is fast upon the horizontal shaft 294, carrying bevel gear 295, which meshes with the bevel gear 248, which is fast on horizontal shaft 249 which runs in front of the furnaces adjacent to, and to the rear of, the secondary air pipes 225, 225ª and 225ᵇ, and is mounted in bearings 296. A valve lever 250, 250ª or 250ᵇ, is fast on shaft 249, back of each secondary pipe and extends downward to the level of the corresponding air regulating valve 236, 236ª or 236ᵇ, and has its lower, free end connected to such valve by link 251, 251ª or 251ᵇ. Consequently when hand wheel 246, is turned lever 247 is oscillated, as is also shaft 249, and valve levers 250, 250ª and 250ᵇ, by which latter the valves 236, 236ª and 236ᵇ are moved in or out to reduce or increase the secondary air supply.

To produce simultaneous movement of both hand wheels 237, and 246, the inner ends of their sleeves carry gear wheels 258, one of which is shown in Fig. 2. These must rotate in unison when they are in mesh with an intermediate gear 252, which is journaled on a swinging lever or latch 253 (best shown in Fig. 1). When the latch is up in the position shown in Fig. 1, the hand wheels are geared together so that when the operator rotates either one, regulation of both the controllers 224, 224ª and 224ᵇ, of the fuel supply and of air valves 236, 236ª and 236ᵇ of the secondary air supply results simultaneously and to the same extent.

In Figs. 4 and 5 is shown the preferred form of valve 236, which is in the form of a flat plate having a number of openings 259, through it, arranged to register with similar openings 260, of the same size, in the valve seat. A valve of this kind distributes the air passing through it evenly around the entire cross section of the air pipe and secures an even, exactly graduated flow of air which would not result if one large opening were employed instead of the numerous small openings shown.

The port openings 259 and 260 are so designed, and the movements of the valves relative to that of the shutters of the fuel controllers are so regulated that a predetermined proportion of fuel and secondary air will be maintained at the burners by the simultaneous operation of the two mechanisms in the manner described.

In operation the shut-off valves 235, 235ª and 235ᵇ would be adjusted by a skilful operator so as to supply enough secondary air for the highest allowable rate of combustion in the corresponding furnace, and thereafter the regulation for lesser rates of combustion would be secured through manipulation by any one of valves 236, 236ª and 236ᵇ, through the apparatus herein described in unison with proper corresponding regulation of the fuel supply thereby.

It is to be understood, that in the fuel controllers 224, 224ª and 224ᵇ, the powdered coal is dropped into a jet of high pressure air which blows it into the combustion chamber of the furnace. This jet remains constant at a speed and volume which will carry the maximum quantity of fuel into the furnace. Regulation of the fuel supply is secured by reducing the amount of powdered coal dropped into the operating zone of this air jet. The amount of high pressure air injected into the furnace by this jet is only a small per cent. of the quantity required to support combustion at any practical rate of furnace operation, and nearly all the air employed to support combustion consists of the so-called "secondary" air supplied through large blast pipes 225, 225ª and 225ᵇ at a relatively low pressure. Proper control of the rate of fuel consumption, while maintaining complete combustion of such fuel as is supplied, is therefore a question of first properly proportioning the amounts of coal and secondary air employed and then maintaining that proportion for different rates of combustion by varying the supplies of fuel and of secondary air proportionately, as by the mechanism hereinbefore described. This will secure substantially correct results because the uniform amount of high pressure air used in the coal discharging jet is relatively so small that it does not appreciably affect the total variation of air quantities supplied to the combustion chamber.

Having described my invention, I claim:

1. An apparatus for burning finely powdered fuel which has, in combination, means for producing a constant jet of high pressure air for injecting the fuel into a combustion chamber, separate means for feeding air for combustion to said chamber, apparatus for varying the amount of fuel fed to the high pressure jet, a valve for varying the amount of air supplied to the furnace for combustion, and a device for connecting these fuel and air controlling sets of means together so that they will operate synchronously and proportionately.

2. An apparatus such as is described in claim 1, combined with a second hand-operated valve controlling the maximum quantity of air which may be supplied for combustion.

WILLIAM O. RENKIN.

Witnesses:
L. E. TURK.
J. F. McCARTHY.